W. G. CHIPLEY.
TIRE.
APPLICATION FILED APR. 10, 1911.
1,064,611.
Patented June 10, 1913.
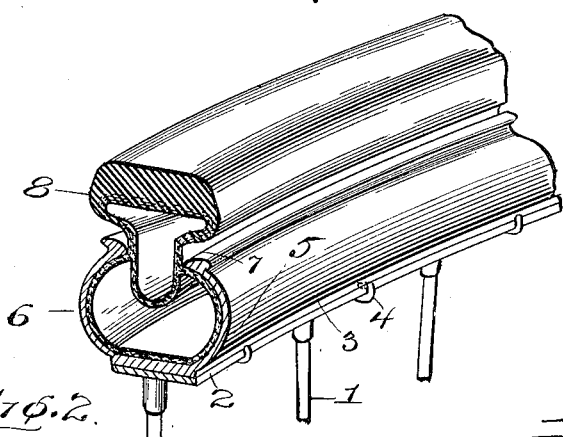
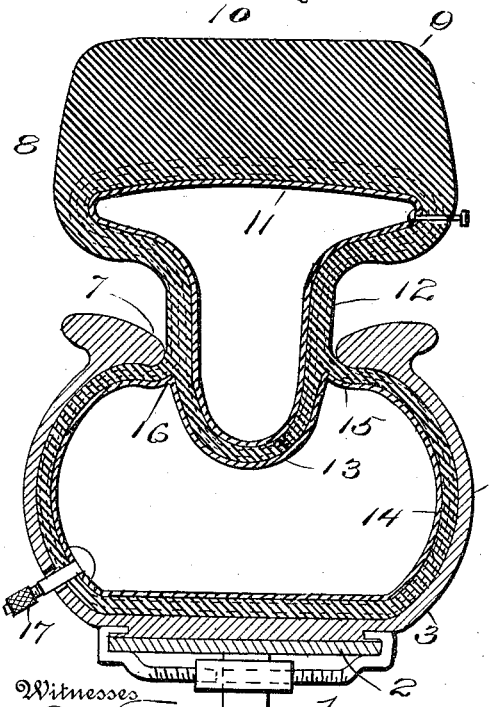
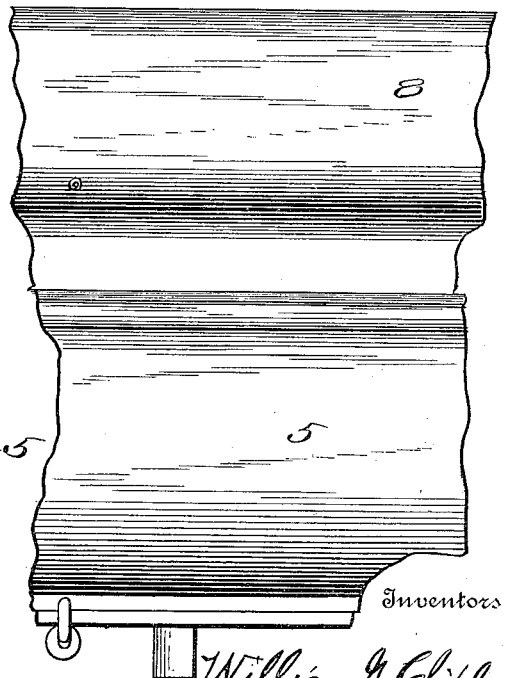

UNITED STATES PATENT OFFICE.

WILLIAM G. CHIPLEY, OF NEW ORLEANS, LOUISIANA, ASSIGNOR TO PNEUMATIC RIM & TIRE COMPANY, OF WILMINGTON, DELAWARE, A CORPORATION OF DELAWARE.

TIRE.

1,064,611.  Specification of Letters Patent.  Patented June 10, 1913.

Application filed April 10, 1911. Serial No. 620,038.

*To all whom it may concern:*

Be it known that I, WILLIAM G. CHIPLEY, a citizen of the United States, residing at New Orleans, in the parish of Orleans and State of Louisiana, have invented certain new and useful Improvements in Tires; and I do hereby declare the following to be a full, clear, and exact description of the invention, such as will enable others skilled in the art to which it appertains to make and use the same.

This invention relates to improvements in tires, and particularly to what might be termed semi-pneumatic tires, and has for an object the provision of an improved structure wherein a substantially solid tread portion may be provided and yet the resilient effect of compressed air be utilized to substantially its fullest extent.

A further object of the invention is the arrangement of a tire having a tread portion, an inflatable portion, and an inflatable neck portion projecting into the first mentioned inflatable portion for guiding the tread portion in its movements so as to permit the tread portion to utilize the resilient effect of the air in the inflatable portion.

A still further object in view is the arrangement in a tire, of a tread portion, an inflatable substantially T-shaped portion merging into the tread portion, and an inflatable retaining portion for fitting a rim, the inflatable portion being connected with and co-acting with the inflatable T-shaped portion in such a manner as to permit the same to project into the retaining inflatable portion.

With these and other objects in view the invention comprises certain novel constructions, combinations, and arrangement of parts as will be hereinafter more fully described and claimed.

In the accompanying drawings: Figure 1 is a fragmentary perspective view of an embodiment of the invention. Fig. 2 is a transverse section through a tire embodying the invention. Fig. 3 is a side view of the structure shown in Fig. 2.

In constructing a tire embodying the invention it is aimed to provide a tire which will not puncture by reason of the fact that the body or tread portion is made substantially solid, and therefore cannot puncture, but constructing the same so as to co-act with a pneumatic inflatable portion in order to give a highly resilient effect to the tread portion. To this end the tread portion is formed with a projecting annular neck portion which may be inflated and which merges into an inflatable retaining portion which is adapted to fit into a rim, preferably of the demountable type. This neck portion is designed to guide the tread portion in its movement, and to also help distribute the resilient effect of the air to the tread of the tire, and to normally support the tread of the tire above or out of contact with the rim to which the tire is secured.

In order that the invention may be more clearly understood an embodiment of the same is shown in the accompanying drawings, in which—

1 indicates the spokes of a wheel of any desired kind, and 2 the felly thereof. Mounted on felly 2 is a demountable rim 3 which rim is held in place by clamps 4. Rim 3 is bulged at points 5 and 6 and is formed with a neck opening 7 which merges into the upper surface of the rim against which the body portion 8 of the tire rests when extreme pressure is brought to bear on the tire. The tire 9 is formed with a tread portion 10 formed preferably of rubber with a few layers of canvas or the like and of such a thickness as to negative any probability of puncturing. The tread portion merges into an inflatable portion 11 which inflatable portion extends downward and forms a neck portion 12 having a projection 13 extending into a retaining inflatable portion 14. Neck portion 12 merges at points 15 and 16 into inflatable portion 14 so that the same is substantially one continuous structure in order that the various parts may operate in proper relationship to each other so that the strain on the tread portion 10 will be directed usually in a direct line toward the center of the bottom of the inflatable portion 14, and in this way utilize properly the resiliency of the air in the inflatable portions. The inflatable portion 14 is made to fit the rounded or bulged portions 5 and 6 so as to resist positively any removal of the tire as long as inflatable portion 14 is inflated. A valve 17 is provided for inflating and deflating portion 14, while a valve 18 is provided for inflating and deflating portion 11.

In applying or removing the tire both of the inflatable portions are preferably deflated when placed in position, after which the desired pressure of air is supplied, which pressure may be easily observed or become known by the use of an indicator on the pump which supplies the air, this forming of course no part of the invention.

What I claim is:

In a device of the character described, the combination with a rim having an annular groove, of a tire formed with an inflatable portion fitting into said annular groove for holding the tire in place, and an independent inflatable portion arranged above the annular groove formed so that one end thereof will project into said annular groove and into said first mentioned inflatable portion.

In testimony whereof I affix my signature in presence of two witnesses.

WILLIAM G. CHIPLEY.

Witnesses:
JOHN L. FLETCHER,
A. L. KITCHIN.

Copies of this patent may be obtained for five cents each, by addressing the "Commissioner of Patents, Washington, D. C."